United States Patent
Kanai

[19]

[11] Patent Number: 6,035,145
[45] Date of Patent: Mar. 7, 2000

[54] REAL-IMAGE VARIABLE MAGNIFICATION VIEW FINDER

[75] Inventor: Moriyasu Kanai, Tokyo, Japan

[73] Assignee: Asahi Kogaku Kogyo Kabushiki Kaisha, Tokyo, Japan

[21] Appl. No.: 09/158,144

[22] Filed: Sep. 22, 1998

[30] Foreign Application Priority Data

Sep. 29, 1997 [JP] Japan ..................... 9-264162

[51] Int. Cl.⁷ ............ G02B 15/14; G02B 23/00; G03B 13/10
[52] U.S. Cl. ............ 396/379; 396/384; 396/386; 359/432; 359/686
[58] Field of Search ............ 396/72, 79, 84, 396/373, 378, 379, 382, 384, 385, 386; 359/362, 421, 422, 431, 432, 642, 643, 676, 678, 684–686, 708, 726, 754, 771, 773

[56] References Cited

U.S. PATENT DOCUMENTS

| | | | |
|---|---|---|---|
| 4,992,809 | 2/1991 | Nozaki et al. | 396/84 |
| 5,309,278 | 5/1994 | Ito et al. | 359/423 |
| 5,376,984 | 12/1994 | Abe | 396/373 |
| 5,434,636 | 7/1995 | Hasushita et al. | 396/373 |
| 5,513,043 | 4/1996 | Abe et al. | 359/691 |
| 5,541,768 | 7/1996 | Ito et al. | 359/422 |
| 5,550,674 | 8/1996 | Abe et al. | 359/422 |
| 5,694,244 | 12/1997 | Abe et al. | 359/432 |
| 5,793,529 | 8/1998 | Abe et al. | 359/422 |

FOREIGN PATENT DOCUMENTS

| | | |
|---|---|---|
| 2-173713 | 7/1990 | Japan . |
| 6-102453 | 4/1994 | Japan . |
| 8-43885 | 2/1996 | Japan . |

*Primary Examiner*—Safet Metjahic
*Assistant Examiner*—J. K. Han
*Attorney, Agent, or Firm*—Greenblum & Bernstein, P.L.C.

[57] ABSTRACT

A real-image variable magnification finder includes an objective optical system of positive power, a condenser lens located at an image forming surface of the objective optical system, an eyepiece optical system of positive power, and an image erection optical system. The objective optical system of positive power includes a first positive lens group, a second negative lens group, a third positive lens group, and a fourth negative lens group. Upon change of magnification from the low magnification extremity to the high magnification extremity, the second lens group is moved to monotonically increase the distance between the second lens group and the first lens group; and the third lens group is moved to monotonically increase the distance between the third lens group and the fourth lens group while the first and fourth lens groups are kept immovable. The finder satisfies the condition defined by (1) $1.2 < m_4 < 2$, wherein $m_4$ represents the lateral magnification of the fourth lens group.

7 Claims, 5 Drawing Sheets

SPHERICAL ABERRATION | LATERAL CHROMATIC ABERRATION | ASTIGMATISM | DISTORTION

Fig. 3
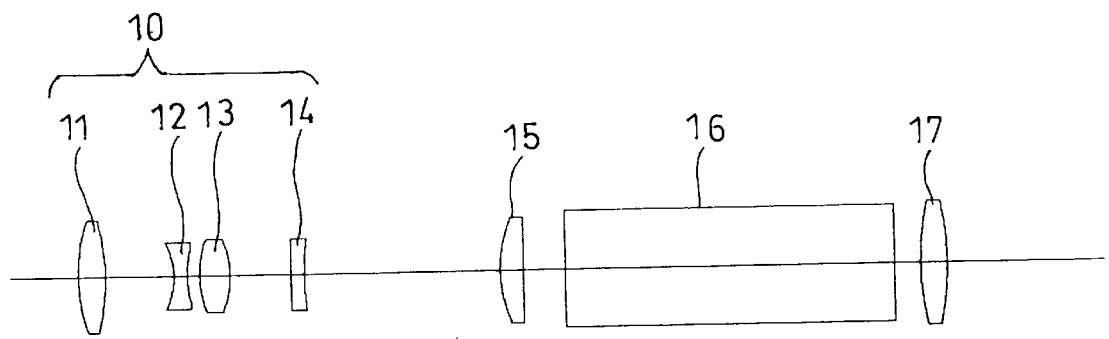
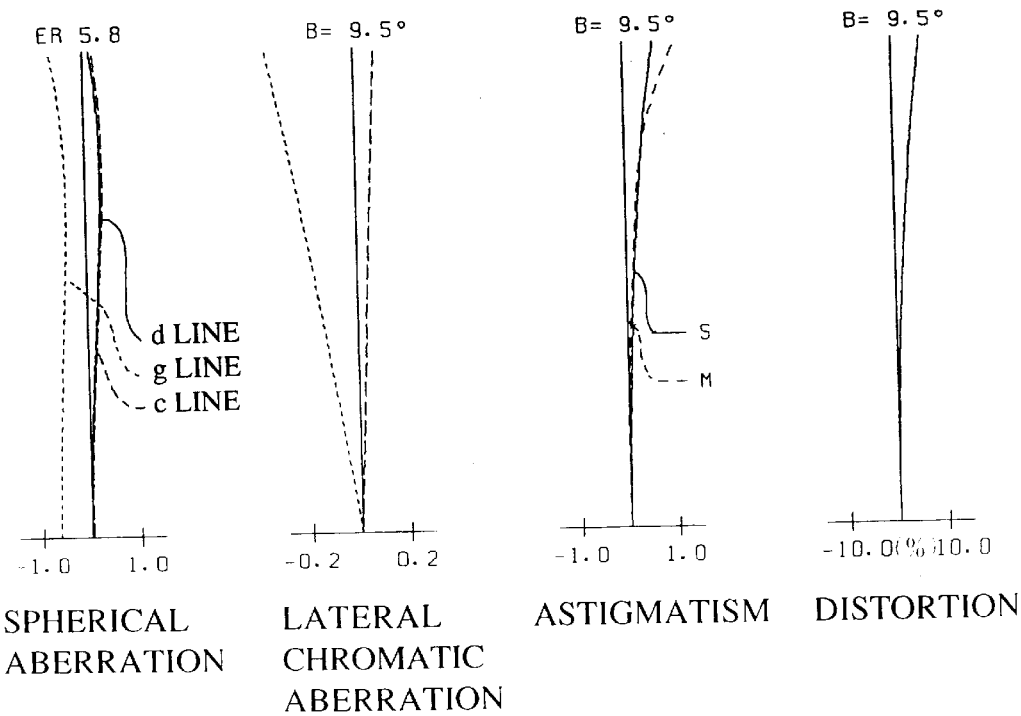
Fig. 4A  Fig. 4B  Fig. 4C  Fig. 4D
SPHERICAL ABERRATION · LATERAL CHROMATIC ABERRATION · ASTIGMATISM · DISTORTION Fig. 5
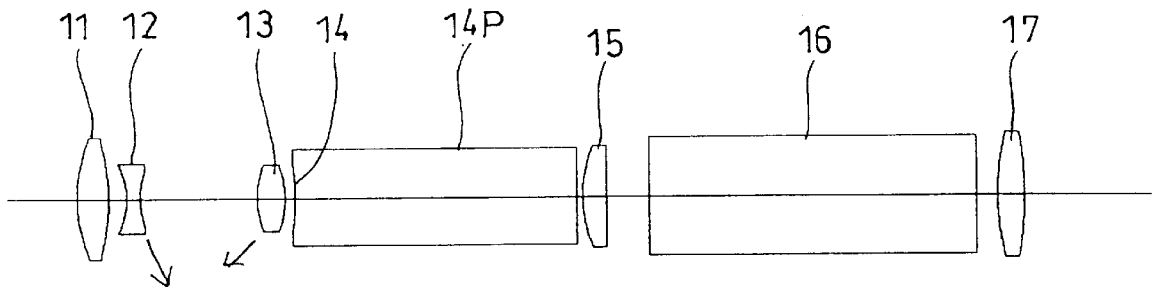
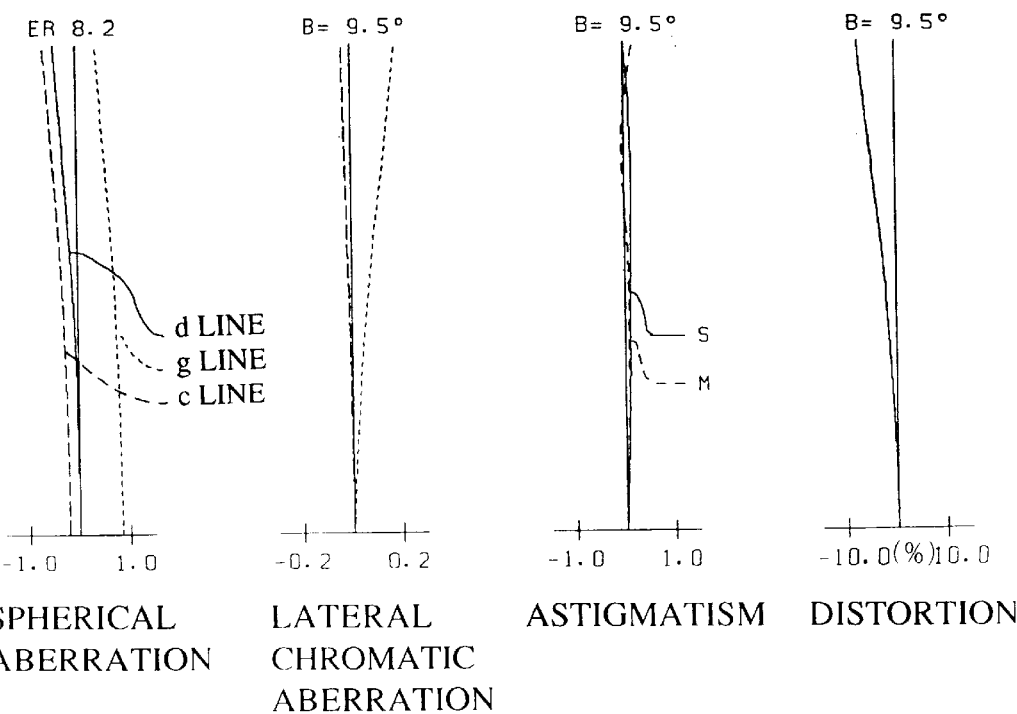
| Fig. 6A | Fig. 6B | Fig. 6C | Fig. 6D |
SPHERICAL ABERRATION | LATERAL CHROMATIC ABERRATION | ASTIGMATISM | DISTORTION Fig. 7
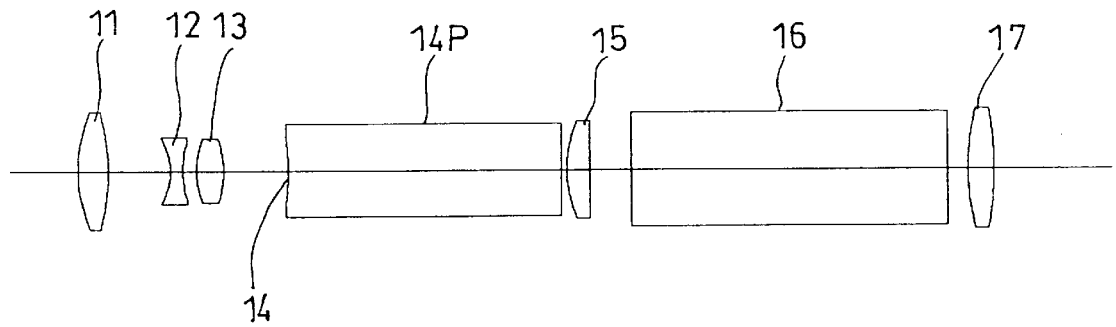
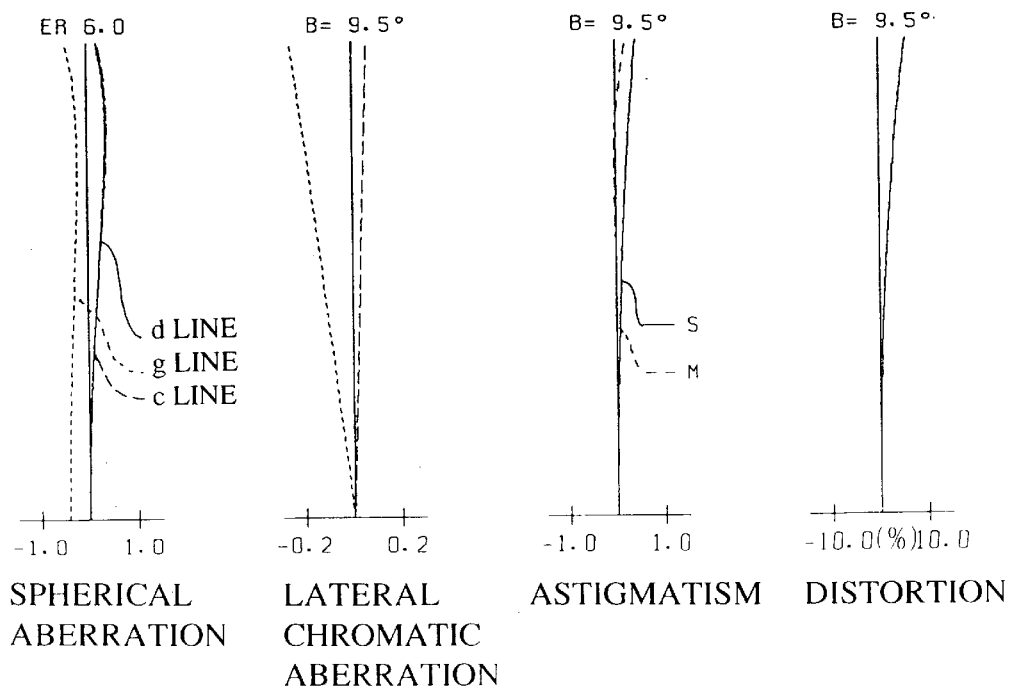
Fig. 8A  Fig. 8B  Fig. 8C  Fig. 8D
SPHERICAL ABERRATION | LATERAL CHROMATIC ABERRATION | ASTIGMATISM | DISTORTION

REAL-IMAGE VARIABLE MAGNIFICATION VIEW FINDER

BACKGROUND OF THE INVENTION

1. Field of the Invention

The present invention relates to a real-image variable magnification view finder having an objective optical system of positive power, a condenser lens located in the vicinity of the image forming plane of the objective optical system, an eyepiece optical system of positive power, and an image erection optical system.

2. Description of the Related Art

In a conventional real-image variable magnification (power) finder for a compact camera, the zoom ratio (magnification) is usually less than 3. A known view finder having a zoom ratio- greater than 3 is large or expensive, contrary to realization of a small and less expensive compact camera.

For example, in a real image variable magnification finder disclosed in Japanese Unexamined Patent Publication No. 6-102453, an objective optical system is composed of a positive first lens group, a negative second lens group, a positive third lens group, and a fourth lens group having at least one negative lens element, in this order from the object side. However, in this view finder, the zoom ratio is approximately 2 which is low, and a large number of the lens elements are necessary.

In a real image variable magnification finder disclosed in Japanese Unexamined Patent Publication No. 2-173713, an objective optical system is composed of a positive first lens group, a negative second lens group, a positive third lens group, and a low powered fourth lens group. In this view finder, the zoom ratio is approximately in the range of 2.5 to 3.5, which is relatively high, but the view finder is large and a large number of expensive lens elements having a high refractive index are necessary.

In a real-image variable magnification finder disclosed in Japanese Unexamined Patent Publication No. 8-43885, an objective optical system is composed of three lens groups consisting of a positive first lens group, a negative second lens group, and a positive third lens group, in this order from the object side. In this view finder, the zoom ratio is higher than 3 and less number of lens elements are needed. However, the view finder is relatively large.

SUMMARY OF THE INVENTION

It is an object of the present invention to provide a small real-image variable magnification finder in which the number of the lens elements can be reduced and a zoom ratio higher than 3 can be obtained.

To achieve the object above-mentioned, according to the present invention, there is provided a real-image variable magnification finder which includes: an objective optical system of positive power, a condenser lens located in the vicinity of the image forming plane of the objective optical system, an eyepiece optical system of positive power, and an image erection optical system. The objective optical system of positive power constitutes a first lens group having positive power, a second lens group having negative power, a third lens group having positive power, and a fourth lens group having negative power, in this order from the object side. Upon change of magnification from the low magnification extremity to the high magnification extremity, the second lens group is moved to monotonically increase the distance between the second lens group and the first lens group, and the third lens group is moved to monotonically increase the distance between the third lens group and the fourth lens group; the first and fourth lens groups remain stationary. The finder satisfies the following condition (1): (1) $1.2<m4<2$; wherein $m_4$ represents the lateral magnification of the fourth lens group.

Preferably, the fourth lens group includes a single lens element, and a reflector having a plurality of reflection surfaces provided between the fourth lens group and the condenser lens, and wherein the finder satisfies the following condition: (2) $1.7f_{w(1-3)}<f_{bd}$; wherein $f_{w(1-3)}$ represents the resultant focal length of the first, second and third lens groups at the low magnification extremity, and $f_{bd}$ represents the reduced distance between the fourth lens group and the condenser lens along the optical axis.

Preferably, the fourth lens group includes a concave surface of a prism on the object side thereof, the prism constituting a part of the image erection optical system and wherein the finder satisfies the following condition: (3) $1.7f_{w(1-3)}<P_d+f_{bd}$; wherein $P_d$ represents the reduced distance of the above-mentioned prism, or prism assembly comprising a plurality of prisms including the above-mentioned prism, located on the object side of the condenser lens. More concretely, $P_d$ represents the reduced distance of the above-mentioned prism in the case that only the above-mentioned prism is located on the object side of the condenser lens. Alternatively, in the case that a prism assembly comprising a plurality of prisms including the above-mentioned prism is located on the object side of the condenser lens, $P_d$ represents the sum of the reduced distances of the prisms and distances (spaces) therebetween.

Preferably, the first, second and third lens groups are each made of a single lens element which is provided with at least one lens surface defined by an aspherical surface, the power of which gradually decreases in the direction away from the optical axis with respect to the power of the paraxial spherical surface thereof; and wherein the finder satisfies the following conditions: (4) $0.5<|m_{2W}|<0.95$; (5) $1.05<|m_{2T}|<1.7$; (6) $0.5<|m_{3W}|<0.95$; (7) $1.05<|m_{3T}|<1.7$; wherein $m_{2W}$ represents the lateral magnification of the second lens group at the low magnification extremity, $m_{2T}$ represents the lateral magnification of the second lens group at the high magnification extremity, $m_{3W}$ represents the lateral magnification of the third lens group at the low magnification extremity, and $m_{3T}$ represents the lateral magnification of the third lens group at the high magnification extremity.

Preferably, the light path between the fourth lens group and the condenser lens is sealed so as to prevent foreign matter from entering.

The reflector provided between the fourth lens group and the condenser lens can be in the form of a roof mirror; and a pentagonal prism can be provided between the condenser lens and the eyepiece system.

Alternatively, the prism whose concave surface on the object side defines the fourth lens group can include a roof prism; and a pentagonal prism can be provided between the condenser lens and the eyepiece system to constitute the image erection optical system which includes the roof prism.

The present disclosure relates to subject matter contained in Japanese Patent Application No.09-264162 (filed on Sep. 29, 1997) which is expressly incorporated herein by reference in its entirety.

BRIEF DESCRIPTION OF THE DRAWINGS

The invention will be described below in detail with reference to the accompanying drawings, in which:

FIG. 3 is a schematic view of a lens arrangement of a real-image variable magnification finder at the high magnification extremity according to a first embodiment of the present invention;

FIGS. 4A–4D show aberration diagrams of the real-image variable magnification finder shown in FIG. 3;

FIG. 5 is a schematic view of a lens arrangement of a real-image variable magnification finder at the low magnification extremity according to a second embodiment of the present invention;

FIGS. 6A–6D show aberration diagrams of the real-image variable magnification finder shown in FIG. 5;

FIG. 7 is a schematic view of a lens arrangement of a real-image variable magnification finder at the high magnification extremity according to a second embodiment of the present invention;

FIGS. 8A–8D show aberration diagrams of the real-image variable magnification finder shown in FIG. 7;

DESCRIPTION OF THE PREFERRED EMBODIMENTS

Figure 1:
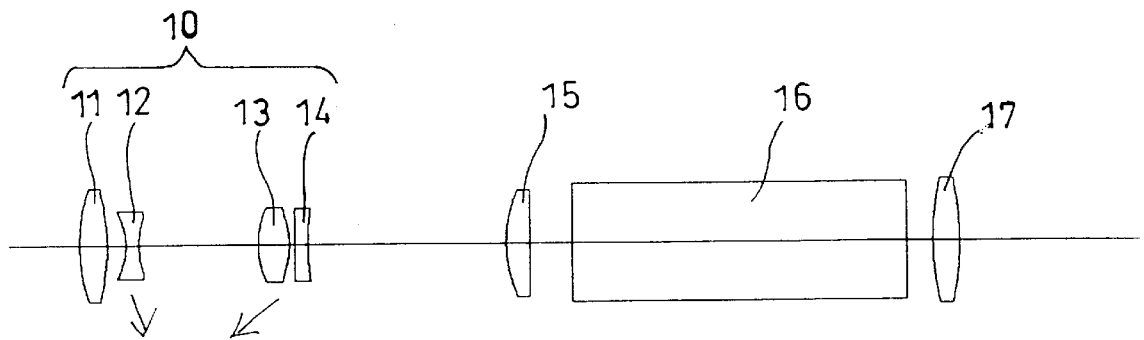
FIG. 1 is a schematic view of a lens arrangement of a real-image variable magnification finder at the low magnification extremity according to a first embodiment of the present invention.

The real-image variable magnification finder according to the present invention includes an objective optical system of positive power, a condenser lens, an eyepiece system of positive power, and an image erection optical system. The objective optical system includes a first lens group having positive power, a second lens group having negative power, a third lens group having positive power, and a fourth lens group having negative power, in this order from the object side. The image erection optical system is provided with four reflection surfaces and can be made of a prism or mirrors or a combination thereof.

An objective optical system constituting three lens groups possesses relatively good optical performance, as disclosed in Japanese Unexamined Patent Publication No. 8-43885, but in order to provide a zoom ratio greater than 3, the size of the optical system is increased.

To make the optical system smaller while obtaining a zoom ratio of 3 or more, it is known to add a fourth stationary lens group to the three-lens group type objective optical system to thereby form a so-called telephoto-type optical system. The telephoto-type optical system is disclosed, for example, in Japanese Unexamined Patent Publication No. 2-173713 or Japanese Unexamined Patent Publication No. 6-102453. However, since the lateral magnification of each lens group (particularly, the fourth lens group) is not arranged appropriately, the number of the lens elements having a high refractive index is increased, thus resulting in an increased manufacturing cost in JUPP '713; or the zoom ratio is at a relatively low ratio of 2 in JUPP ' 453.

In the present invention, the lateral magnification of the fourth lens group is selected at an appropriate value as specified in condition (1) to decrease the physical size of the optical system and provide a high zoom ratio. Namely, condition (1) specifies the requirement to make the overall length of the four-lens-group objective optical system shorter than that of a three-lens-group objective optical system.

If the lateral magnification is smaller than the lower limit in condition (1), the lateral magnification of the fourth lens group is reduced so that the physical size of the objective optical system cannot be reduced. If the thickness of the fourth lens group is zero, even if the lateral magnification is smaller than the lower limit but larger than 1 ($1<m_4$), the overall length would be shorter than an objective optical system having no fourth lens group. However, in practice, the lens has a certain thickness, and hence, the lateral magnification satisfies the requirement specified in condition (1), miniaturizing the objective lens system.

If the lateral magnification exceeds the upper limit in condition (1), the power of the first through third lens groups must be increased, so that it is difficult to compensate spherical or coma aberration.

If the image erection optical system utilizes a mirror and a prism, in order to miniaturize the whole optical system, it is preferable that the mirror and the prism be arranged separately; one of which being located on the object side of the primary image-forming plane, and the other optical element being located on the eyepiece-system side of the primary image-forming plane. In this arrangement, if a plurality of reflection surfaces can be placed on the object side of the primary image-forming plane, it is possible to reduce the number of the reflection surfaces to be arranged on the eyepiece-system side of the primary image-forming plane, thus resulting in the miniaturization of the whole optical system.

Condition (2) specifies requirements to allow a reflector, an optical element which forms part of the image erection optical system, having a plurality of reflection surfaces (e.g., a roof mirror) to be disposed between the fourth lens group of the objective optical system and the condenser lens. If the reduced spatial distance is smaller than the lower limit, it is difficult to dispose the reflector (such as a roof mirror having a plurality of reflection surfaces) between the fourth lens group and the condenser lens.

A reflector having a plurality of reflection surfaces provided in the objective optical system can be in the form of a prism, e.g., a roof prism. In case of a roof prism being provided, it is preferable that the fourth lens group include a concave surface of the prism on the object side.

Condition (3) specifies the requirement to allow the prism, which forms a part of the image erection optical system and whose concave surface on the object side constitutes the fourth lens group, to be disposed between the fourth lens group (concave surface) and the condenser lens.

If the value defined in condition (3) is smaller than the lower limit, it is difficult to dispose the prism having a plurality of reflection surfaces in front of the condenser lens.

To reduce the number of the lens elements, it is preferable that the first through third lens groups of the objective optical system each constitute a single lens element. Preferably, to obtain a high zoom ratio, each of the lens groups 1 through 3, which each constitutes a single lens element, includes at least one aspherical surface, and the lateral magnifications of the second lens group at the low magnification extremity and the high magnification position are set to satisfy conditions (4) and (5) and the lateral magnifications of the third lens group at the low magnification extremity and the high magnification extremity are set to satisfy conditions (6) and (7), respectively.

If the lateral magnification is smaller than the lower limit in condition (4), the moving amount of the third lens group having positive power becomes large so that it is difficult to miniaturize the objective optical system. If the lateral magnification exceeds the upper limit, the aberration fluctuations caused by the movement of the second lens group becomes so large that it is difficult to correct the aberrations.

If the lateral magnification is smaller than the lower limit in condition (5), it is impossible to obtain a high zoom ratio of more than 3. If the lateral magnification exceeds the upper limit, it is difficult to correct the aberrations at the high magnification extremity when, in order to miniaturize the optical system, the third lens group constitutes a single lens.

If the lateral magnification is smaller than the lower limit in condition (6), the displacement of the second lens group having negative power increases so that it is difficult to miniaturize the objective optical system. If the lateral magnification exceeds the upper limit, aberration fluctuations caused by the movement of the third lens group is so large that it is difficult to correct the aberrations.

If the lateral magnification is smaller than the lower limit in condition (7), zoom ratio higher than 3 can not be obtained. If the lateral magnification exceeds the upper limit, it becomes difficult to correct the aberrations at the high magnification extremity when, in order to miniaturize the optical system, the third lens group constitutes a single lens element.

Numerical examples (Embodiments) of the present invention will be discussed below.

<Embodiment 1>

Figures 2A, 2B, 2C, 2D:
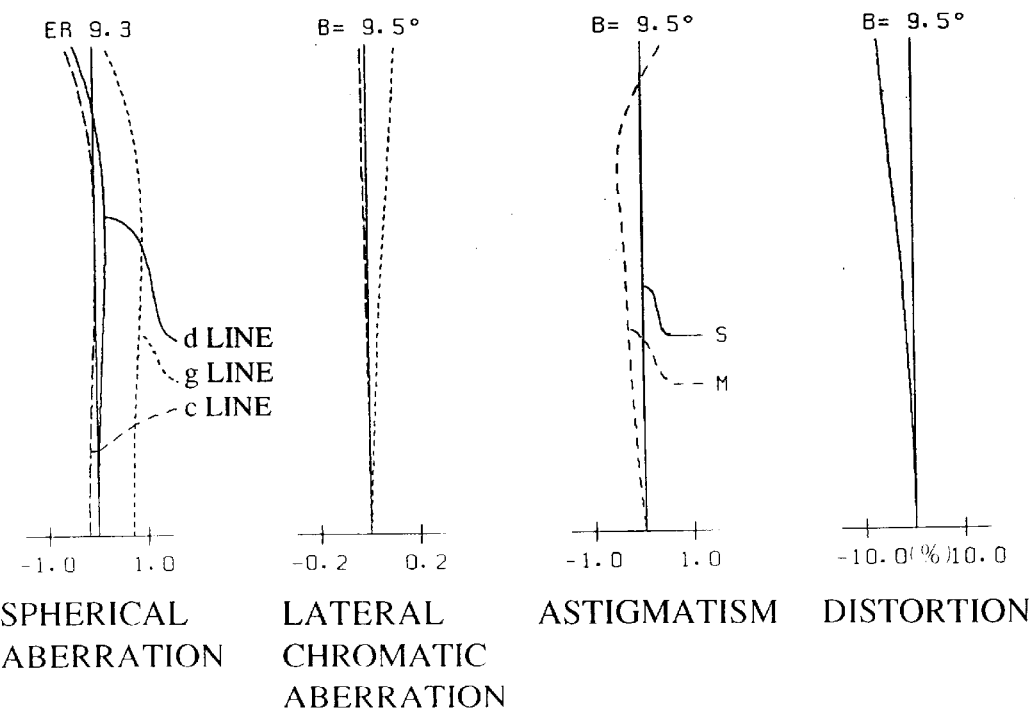
FIGS. 2A–2D show aberration diagrams of the real-image variable magnification finder shown in FIG. 1.

FIGS. 1 through 4 show a first embodiment of a real-image variable magnification finder according to the present invention. The lens arrangement at the low magnification extremity and high magnification extremity are shown in FIGS. 1 and 3, respectively. The aberration diagrams at the low magnification extremity and the high magnification extremity are shown in FIGS. 2 and 4, respectively. Table 1 below shows numerical data of the lens system.

The lens system includes a first lens group 11, a second lens group 12, a third lens group 13, a fourth lens group 14, a condenser lens group 15, a prism (image erection optical system) 16, and an eyepiece optical system 17. The first through fourth lens groups (11–14) form an objective optical system 10 and each constitutes a single lens element. Upon varying magnification from a low magnification to a high magnification, the second lens group 12 is moved rearwardly to monotonically increase the distance between the second lens group 12 and the first lens group 11; the third lens group 13 is moved forwardly to monotonically increase the distance between the third lens group 13 and the fourth lens group 14, while the first and fourth lens groups 11 and 14 are stationary.

Figure 9:
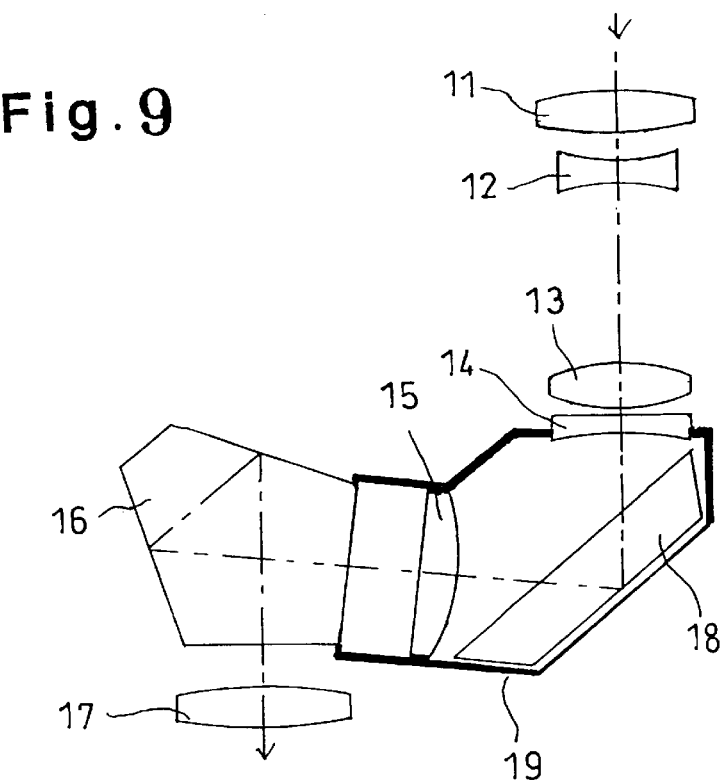
FIG. 9 is a schematic view of an image erection optical system in a real-image variable magnification finder according to a first embodiment of the present invention.

Each group of the first through third lens groups constitutes a single lens element provided with a rotationally-symmetrical aspherical surface which is shown in the tables as surfaces Nos. 2, 3 and 6, respectively. The condenser lens group 15 and the eyepiece system 17 are also each made of a single lens element. The eye-side surface of the eyepiece system 17 (surface No.14) is defined by a rotationally-symmetrical aspherical surface. The image erection optical system includes a pentagonal prism 16 and a roof mirror 18; the roof mirror 18 is provided between the fourth lens group 14 and the condenser lens group (field lens and field frame) 15, as shown in FIG. 9. The light path between the fourth lens group 14 and the pentagonal prism 16 is sealed by a seal member 19, using the stationary fourth lens group 14 and the pentagonal prism 16. The condenser lens group 15 is provided with a field frame drawn on the surface No. 10 thereof located on the image side (surface No. 10).

In the following tables and the drawings, the d-line, the g-line, and the C-line represent the spherical aberrations and the lateral chromatic aberrations at the respective wavelengths; S represents the sagittal image surface; M represents the meridional image surface; ω designates the half angle of view; fo the focal length of the objective optical system; fe the focal length of the eyepiece optical system; R the radius of curvature; D the distance between the lenses or the lens thickness; Nd the refractive index of the d-line; vd the Abbe number, respectively.

TABLE 1

ω = 24.6°~6.1°
fo = 11.43~43.17
fe = 29.30
finder magnification: 0.39~1.48

| Surface No. | R | D | Nd | vd |
|---|---|---|---|---|
| 1 | 18.019 | 2.62 | 1.49176 | 57.4 |
| 2* | −16.546 | 1.71–6.55 | — | — |
| 3* | −5.830 | 1.20 | 1.58547 | 29.9 |
| 4 | 9.346 | 11.28–1.19 | — | — |
| 5 | 9.315 | 2.89 | 1.49176 | 57.4 |
| 6* | −8.089 | 0.52–5.77 | — | — |
| 7 | ∞ | 1.20 | 1.58547 | 29.9 |
| 8 | 24.452 | 18.60 | — | — |
| 9 | 13.100 | 2.20 | 1.49176 | 57.4 |
| 10 | ∞ | 4.00 | — | — |
| 11 | ∞ | 31.50 | 1.49176 | 57.4 |
| 12 | ∞ | 2.50 | — | — |
| 13 | 27.965 | 2.50 | 1.49176 | 57.4 |
| 14* | −28.847 | — | — | — |

*designates a rotationally-symmetrical aspherical surface.

The shape of the aspherical surface can be generally expressed as follows:

$$X = CY^2/\{1+[1-(1+K)C^2Y^2]^{1/2}\} + A4Y^4 + A6Y^6 + A8Y^8 + A10Y^{10} + \ldots$$

wherein,

Y represents a height above the axis,

X represents a distance from a tangent plane of an aspheric vertex,

C represents a curvature of the aspheric vertex (1/r),

K represents a conic constant,

A4 represents a fourth-order aspheric factor,

A6 represents a sixth-order aspheric factor,

A8 represents a eighth-order aspheric factor,

A10 represents a tenth-order aspheric factor.

Aspheric Data (the aspherical surface coefficient is 0 where not indicated):

No.2: K=0.0, A4=0.15489×10$^{-3}$, A6=−0.13878×10$^{-6}$;

No.3: K=−0.20000×10, A4=0.57568×10$^{-3}$, A6=−0.39368×10$^{-5}$;

No.6: K=0.0, A4=0.76787×10$^{-3}$, A6=0.47222×10$^{-5}$;

No.14: K=0.0, A4=0.33713×10$^{-4}$, A6=0.18963×10$^{-6}$.

<Embodiment 2>

FIGS. 5 through 8 show a second embodiment of a real-image variable magnification finder according to the present invention. The lens arrangement at the low magnification extremity and high magnification extremity are shown in FIGS. 5 and 7, respectively. The aberration diagrams at the low magnification extremity and the high magnification extremity are shown in FIGS. 6 and 8, respectively. Table 2 below shows numerical data of the lens system.

Figure 10:
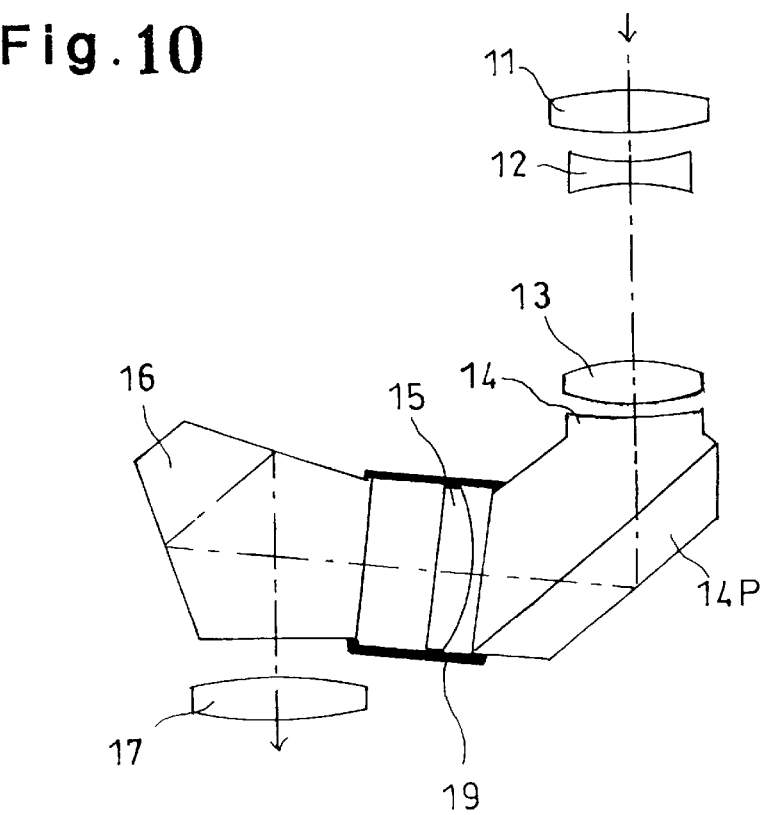
FIG. 10 is a schematic view of an image erection optical system in a real-image variable magnification finder according to a second embodiment of the present invention.

In this embodiment, the fourth lens group 14 is constituted by a concave surface of the roof prism 14P which forms a part of the image erection optical system, on the object side. The image erection optical system is comprised of two reflection surfaces of the roof prism 14P and two reflection surfaces of the pentagonal prism 16, as shown in FIG. 10. The light path between the roof prism 14P and the pentagonal prism 16 is optically insulated by the seal member 19, using the stationary roof prism 14P (fourth lens group 14) and the pentagonal prism 16. The condenser lens group 15 is provided with a field frame drawn on the surface thereof located on the image side (surface No. 10). The remainder of the structure of the lens system and the mode of operation upon magnification change are same as those of the first embodiment.

TABLE 2

$\omega = 24.6° \sim 6.1°$
$fo = 11.08 \sim 41.90$
$fe = 28.37$
finder magnification ; 0.39~1.48

| Surface No. | R | D | Nd | vd |
| --- | --- | --- | --- | --- |
| 1 | 14.264 | 2.99 | 1.49176 | 57.4 |
| 2* | −17.752 | 1.74−5.98 | — | — |
| 3* | −5.546 | 1.20 | 1.58547 | 29.9 |
| 4 | 8.123 | 10.95−1.40 | — | — |
| 5 | 9.172 | 2.60 | 1.49176 | 57.4 |
| 6* | −7.991 | 0.96−6.26 | — | — |
| 7 | −24.027 | 26.42 | 1.49176 | 57.4 |
| 8 | ∞ | 0.50 | — | — |
| 9 | 12.309 | 2.20 | 1.49176 | 57.4 |
| 10 | ∞ | 4.00 | — | — |
| 11 | ∞ | 31.00 | 1.49176 | 57.4 |
| 12 | ∞ | 2.00 | — | — |
| 13 | 25.758 | 2.50 | 1.49176 | 57.4 |
| 14* | −29.461 | — | — | — |

*designates a rotationally-symmetrical aspherical surface.

Aspheric Data (the aspherical surface coefficient is 0 where not indicated):

No.2: K=0.0, A4=0.18485×10$^{-3}$, A6=−0.58473×10$^{-6}$;

No.3: K=−0.20000×10, A4=0.10167×10$^{-2}$, A6=−0.22945×10$^{-4}$;

No.6: K=0.0, A4=0.89420×10$^{-3}$, A6=−0.18793×10$^{-5}$;

No.14: K=0.0, A4=0.31153×10$^{-4}$, A6=0.21175×10$^{-6}$.

In the second embodiment, a single prism 14P having two reflecting surfaces is located on the object side of the condenser lens 15. Alternatively, it is possible to replace the single prism 14P with a prism assembly having a plurality of prisms. In this case, the prism assembly satisfies condition (3).

Table 3 below shows numerical data of the two embodiments for each conditions (1) through (7).

TABLE 3

| | Embodiment 1 | Embodiment 2 |
| --- | --- | --- |
| Condition (1) | 1.483 | 1.405 |
| Condition (2) | $f_{w(1-3)} = 8.154$ $f_{bd} = 2.28\, f_{w(1-3)}$ | — |
| Condition (3) | — | $f_{w(1-3)} = 8.373$ $P_d + f_{bd} = 2.18\, f_{w(1-3)}$ |

TABLE 3-continued

| | Embodiment 1 | Embodiment 2 |
| --- | --- | --- |
| Condition (4) | 0.642 | 0.676 |
| Condition (5) | 1.340 | 1.429 |
| Condition (6) | 0.700 | 0.739 |
| Condition (7) | 1.264 | 1.318 |

As can be seen in Table 3, the first and second embodiments of the present invention satisfy conditions (1), (4) through (7) and the first embodiment satisfies condition (2) and the second embodiment satisfies condition (3).

As may be understood from the above discussion, according to the present invention, a small real-image-type variable magnification finder having a high magnification of 3 or more wherein the number of the lens elements is reduced can be provided.

What is claimed is:

1. A real-image variable magnification finder, comprising:

an objective optical system having a positive power;

a condenser lens located in a vicinity of an image forming plane of said objective optical system;

an eyepiece optical system having a positive power; and an image erection optical system, said objective optical system comprising a first lens group having a positive power, a second lens group having a negative power, a third lens group having a positive power, and a fourth lens group having a negative power, in this order from an object side, wherein, upon a change of a magnification from a low magnification extremity to a high magnification extremity, said second lens group is moved to monotonically increase a distance between said second lens group and said first lens group, and said third lens group being moved to monotonically increase a distance between said third lens group and said fourth lens group; while said first lens group and said fourth lens group remain stationary, and wherein said finder satisfies the following condition:

$$1.2 < m_4 < 2,$$

wherein, $m_4$ represents a lateral magnification of said fourth lens group.

2. The real-image variable magnification finder of claim 1, wherein said fourth lens group comprises a single lens element, a reflector having a plurality of reflection surfaces being provided between said fourth lens group and said condenser lens, wherein said reflector forms part of said image erection optical system, and wherein said finder satisfies the following condition:

$$1.7 f_{w(1-3)} < f_{db},$$

wherein $f_{w(1-3)}$ represents a resultant focal length of said first lens group, said second lens group and said third lens group at said low magnification extremity, and $f_{db}$ represents a reduced distance between said fourth lens group and said condenser lens on an optical axis.

3. The real-image variable magnification finder of claim 2, wherein said reflector provided between said fourth lens group and said condenser lens is in the form of a roof mirror, a pentagonal prism being provided between said condenser lens and said eyepiece optical system to form said image erection optical system together with said roof mirror.

4. The real-image variable magnification finder of claim 1, wherein said fourth lens group comprises a concave surface of a prism on the object side thereof, said prism comprising a part of said image erection optical system, and wherein said finder satisfies the following condition:

$$1.7f_{w(1-3)} < P_d + f_{db},$$

wherein $P_d$ represents a reduced distance of one of said prism or a prism assembly comprising a plurality of prisms including said prism, located on said object side of said condenser lens.

5. The real-image variable magnification finder of claim 1, wherein a light path between said fourth lens group and said condenser lens is sealed, so as to prevent foreign matter from entering.

6. The real-image variable magnification finder of claim 1, wherein said first lens group, said second lens group and said third lens group are each made of a single lens element which is provided with at least one lens surface defined by an aspherical surface, a power of which gradually decreases in a direction away from an optical axis with respect to a power of a paraxial spherical surface thereof; and wherein said finder satisfies the following conditions:

$$0.5 < |m_{2W}| < 0.95;$$

$$1.05 < |m_{2T}| < 1.7;$$

$$0.5 < |m_{3W}| < 0.95;$$

and $$1.05 < |m_{3T}| < 1.7,$$

wherein $m_{2W}$ represents a lateral magnification of said second lens group at said low magnification extremity, $m_{2T}$ represents said lateral magnification of said second lens group at said high magnification extremity, $m_{3W}$ represents lateral magnification of said third lens group at said low magnification extremity, and $m_{3T}$ represents said lateral magnification of said third lens group at said high magnification extremity.

7. The real-image variable magnification finder of claim 4, wherein said prism comprises a roof prism, a pentagonal prism being provided between said condenser lens and said eyepiece optical system to form said image erection optical system together with said roof prism.

* * * * *